(12) United States Patent
Nakamura et al.

(10) Patent No.: US 10,427,361 B2
(45) Date of Patent: Oct. 1, 2019

(54) FIBER-REINFORCED SHEET AND STRUCTURE

(71) Applicant: SEKISUI CHEMICAL CO., LTD., Osaka (JP)

(72) Inventors: Masanori Nakamura, Kyoto (JP); Yasushi Nakata, Kyoto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/558,357

(22) PCT Filed: Aug. 1, 2016

(86) PCT No.: PCT/JP2016/072535
§ 371 (c)(1),
(2) Date: Sep. 14, 2017

(87) PCT Pub. No.: WO2017/056683
PCT Pub. Date: Apr. 6, 2017

(65) Prior Publication Data
US 2018/0093430 A1     Apr. 5, 2018

(30) Foreign Application Priority Data

Sep. 30, 2015  (JP) ................................. 2015-195416

(51) Int. Cl.
*B32B 3/30*       (2006.01)
*B32B 5/26*       (2006.01)
(Continued)

(52) U.S. Cl.
CPC ............ *B29C 70/06* (2013.01); *B29C 70/083* (2013.01); *B32B 3/30* (2013.01); *B32B 5/28* (2013.01); *Y02E 10/721* (2013.01)

(58) Field of Classification Search
CPC .... B32B 3/30; B32B 5/26; B32B 5/28; Y10T 428/24994; Y10T 428/24479;
(Continued)

(56) References Cited

U.S. PATENT DOCUMENTS

2007/0267775 A1   11/2007  Ellis
2009/0202809 A1    8/2009  Cawse
(Continued)

FOREIGN PATENT DOCUMENTS

EP    0 312 993      4/1989
JP    1-200914       8/1989
(Continued)

OTHER PUBLICATIONS

International Search Report dated Oct. 25, 2016 in corresponding International Application No. PCT/JP2016/072535.
(Continued)

*Primary Examiner* — Joanna Pleszczynska
(74) *Attorney, Agent, or Firm* — Wenderoth, Lind & Ponack, L.L.P.

(57) ABSTRACT

The present invention relates to a fiber-reinforced sheet having excellent strength. The fiber-reinforced sheet according to the present invention comprises a resin and a fiber bundle, and the fiber-reinforced sheet comprises a resin-unimpregnated fiber bundle portion having a surface not impregnated with the resin or a partially resin-impregnated fiber bundle portion having a surface not impregnated with the resin, has a first surface and a second surface opposite to the first surface, comprises a sheet body portion and at least one ridge portion protruding from the sheet body portion on the first surface, and comprises the resin-unimpregnated fiber bundle portion or the partially resin-impregnated fiber bundle portion at at least one of the first surface and the second surface.

22 Claims, 5 Drawing Sheets

(51) Int. Cl.
*B32B 5/28* (2006.01)
*B29C 70/06* (2006.01)
*B29C 70/08* (2006.01)

(58) Field of Classification Search
CPC ....... Y10T 428/2457; Y10T 428/24595; Y10T 428/24603; Y10T 428/24612; Y02E 10/725
See application file for complete search history.

(56) References Cited

U.S. PATENT DOCUMENTS

2012/0276795 A1    11/2012  Goto et al.
2014/0166208 A1*  6/2014  Schubiger ............ B29C 66/721
                                                           156/468

FOREIGN PATENT DOCUMENTS

| JP | 4-89209 | 3/1992 |
|----|---------|--------|
| JP | 2002-249605 | 9/2002 |
| JP | 2004-106347 | 4/2004 |
| JP | 2009-287514 | 12/2009 |
| JP | 2010-202824 | 9/2010 |
| JP | 2011-255533 | 12/2011 |
| JP | 2014-15567 | 1/2014 |

OTHER PUBLICATIONS

International Preliminary Report on Patentability dated Apr. 12, 2018 in International (PCT) Application No. PCT/JP2016/072535.
Extended European Search Report dated May 14, 2019 in corresponding European patent application No. 16850860.4.

* cited by examiner

FIBER-REINFORCED SHEET AND STRUCTURE

TECHNICAL FIELD

The present invention relates to a fiber-reinforced sheet comprising fiber bundles. In addition, the present invention relates to a structure using the above fiber-reinforced sheet.

BACKGROUND ART

Generally, in a fiber-reinforced sheet, high performance is developed by impregnating reinforcing fiber bundles with a resin and integrating the resin and the reinforcing fibers.

Examples of a resin with which reinforcing fiber bundles are impregnated include thermosetting resins and thermoplastic resins. The melt viscosity of high molecular weight thermosetting resins and general thermoplastic resins is high. It is not easy to impregnate reinforcing fiber bundles with a resin having high melt viscosity. Therefore, it is not easy to mold a fiber-reinforced sheet into various shapes, and it is not easy to mold particularly a large-sized fiber-reinforced sheet.

A fiber-reinforced plastic molded article having a curved shape is disclosed in the following Patent Literature 1. This molded article is a laminate of at least three or more layers comprising continuous fiber-reinforced sheets having fiber bundles. In this molded article, a nonwoven fabric sheet is sandwiched in the second layer from the outermost layer constituting a design surface. This molded article is curved in the direction orthogonal to the orientation direction of the continuous fiber bundles in the outermost layer. This molded article is used, for example, as a component or an enclosure portion of a personal computer, OA equipment, a cellular phone, or the like. In Patent Literature 1, the molded article is relatively small, and a windmill blade is not particularly described as an application of the molded article.

Conventionally, large-sized molded bodies are used for windmill blades, aircraft, ships, and the like. High strength, light weight, and high durability are required of windmill blades used for wind power generation.

A windmill blade in which a spar cap that is a main strength member of the blade is disposed between outer cover layers or on the inside is disclosed in the following Patent Literature 2. The above spar cap is molded separately from the blade (windmill blade body). The windmill blade is obtained by disposing the above spar cap on a mold together with dry fibers for the above outer cover layers and a sandwich core material and impregnating them with a resin with vacuuming.

RELATED ART DOCUMENTS

Patent Documents

Patent Literature 1: Japanese Patent Laid-Open No. 2011-255533
Patent Literature 2: Japanese Patent Laid-Open No. 2009-287514

SUMMARY OF THE INVENTION

Problems to be Solved by the Invention

In conventional fiber-reinforced sheets, it is difficult to sufficiently increase strength. Particularly in the case of a large-sized fiber-reinforced sheet whose dimension in the length direction is 1 m or more, further 3 m or more, the strength does not increase sufficiently. In addition, in the windmill blade described in Patent Literature 2, the strength may not increase sufficiently.

It is an object of the present invention to provide a fiber-reinforced sheet having excellent strength. It is also an object of the present invention to provide a structure having excellent strength.

Means for Solving the Problems

According to a broad aspect of the present invention, there is provided a fiber-reinforced sheet comprising a resin and a fiber bundle, wherein the fiber-reinforced sheet comprises a resin-unimpregnated fiber bundle portion having a surface not impregnated with the resin or a partially resin-impregnated fiber bundle portion having a surface not impregnated with the resin, the sheet has a first surface and a second surface opposite to the first surface, the sheet comprises a sheet body portion and at least one ridge portion protruding from the sheet body portion on the first surface, and the sheet comprises the resin-unimpregnated fiber bundle portion or the partially resin-impregnated fiber bundle portion at at least one of the first surface and the second surface.

In a particular aspect of the fiber-reinforced sheet according to the present invention, the ridge portion comprises the resin.

In a particular aspect of the fiber-reinforced sheet according to the present invention, the ridge portion comprises a non-fiber-bundle-containing resin portion not comprising a fiber bundle.

In a particular aspect of the fiber-reinforced sheet according to the present invention, the fiber-reinforced sheet does not comprise or comprises a resin-impregnated fiber bundle portion having a surface impregnated with the resin, the ridge portion comprises the non-fiber-bundle-containing resin portion, and the ridge portion comprises the resin-unimpregnated fiber bundle portion, the partially resin-impregnated fiber bundle portion, or the resin-impregnated fiber bundle portion, the non-fiber-bundle-containing resin portion is positioned inside the ridge portion, and the resin-unimpregnated fiber bundle portion, the partially resin-impregnated fiber bundle portion, or the resin-impregnated fiber bundle portion is positioned in a surface portion of the ridge portion.

In a particular aspect of the fiber-reinforced sheet according to the present invention, the fiber-reinforced sheet comprises the resin-impregnated fiber bundle portion having the surface impregnated with the resin.

In a particular aspect of the fiber-reinforced sheet according to the present invention, the fiber-reinforced sheet comprises the resin-impregnated fiber bundle portion at the second surface.

In a particular aspect of the fiber-reinforced sheet according to the present invention, the fiber-reinforced sheet comprises the resin-impregnated fiber bundle portion on the first surface side where the ridge portion is positioned.

In a particular aspect of the fiber-reinforced sheet according to the present invention, the fiber-reinforced sheet comprises the resin-unimpregnated fiber bundle portion or the partially resin-impregnated fiber bundle portion on the first surface side where the ridge portion is positioned.

In a particular aspect of the fiber-reinforced sheet according to the present invention, the fiber-reinforced sheet comprises the resin-unimpregnated fiber bundle portion or the partially resin-impregnated fiber bundle portion at the second surface.

In a particular aspect of the fiber-reinforced sheet according to the present invention, the ridge portion has a rectilinearly extending portion, and in another particular aspect, the ridge portion has a curvilinearly extending portion.

In a particular aspect of the fiber-reinforced sheet according to the present invention, a number of the ridge portions is plural. In a particular aspect of the fiber-reinforced sheet according to the present invention, directions in which a plurality of the ridge portions adjacent to each other extend are parallel or directions shifted from each other by 10° or less.

In a particular aspect of the fiber-reinforced sheet according to the present invention, the fiber-reinforced sheet has a curved portion.

In a particular aspect of the fiber-reinforced sheet according to the present invention, the ridge portion has a recess at a side surface.

In a particular aspect of the fiber-reinforced sheet according to the present invention, the fiber-reinforced sheet comprises at least one second ridge portion protruding from the sheet body portion on the second surface.

In a particular aspect of the fiber-reinforced sheet according to the present invention, a dimension in a length direction is 1 m or more.

In a particular aspect of the fiber-reinforced sheet according to the present invention, the fiber-reinforced sheet is used for a windmill blade.

According to a broad aspect of the present invention, there is provided a structure comprising an attachment target member; and a fiber resin portion formed from the above-described fiber-reinforced sheet, wherein the fiber resin portion is attached to a surface of the attachment target member.

In a particular aspect of the structure according to the present invention, the attachment target member is a windmill blade body, the fiber resin portion is attached to a surface of the windmill blade body, and the structure is a windmill blade. In a particular aspect of the structure according to the present invention, the fiber-reinforced sheet does not comprise or comprises the resin-impregnated fiber bundle portion having the surface impregnated with the resin, and the fiber resin portion is attached to the surface of the attachment target member in a state in which the resin-unimpregnated fiber bundle portion, the partially resin-impregnated fiber bundle portion, or the resin-impregnated fiber bundle portion in the fiber-reinforced sheet is impregnated with a resin or an adhesive.

Effect of the Invention

The fiber-reinforced sheet according to the present invention comprises a resin and a fiber bundle, comprises a resin-unimpregnated fiber bundle portion having a surface not impregnated with the resin or a partially resin-impregnated fiber bundle portion having a surface not impregnated with the resin, has a first surface and a second surface opposite to the above first surface, comprises a sheet body portion and at least one ridge portion protruding from the above sheet body portion on the above first surface, and comprises the above resin-unimpregnated fiber bundle portion or the above partially resin-impregnated fiber bundle portion at at least one of the above first surface and the above second surface, and therefore the strength can be increased.

MODE(S) FOR CARRYING OUT THE INVENTION

The details of the present invention will be described below.

A fiber-reinforced sheet according to the present invention comprises a sheet body portion and a plurality of first ridge portions protruding from the first surface of the above sheet body portion.

The fiber-reinforced sheet according to the present invention comprises a resin and fiber bundles. The fiber-reinforced sheet according to the present invention comprises a resin-unimpregnated fiber bundle portion having a surface not impregnated with the resin (outside surface) or a partially resin-impregnated fiber bundle portion having a surface not impregnated with the resin (outside surface). The above resin-unimpregnated fiber bundle portion or the above partially resin-impregnated fiber bundle portion each has a surface not impregnated with the resin. The above resin-unimpregnated fiber bundle portion is not impregnated with the resin. The above resin-unimpregnated fiber bundle portion comprises fiber bundles. The above partially resin-impregnated fiber bundle portion is partially impregnated with the resin. The above partially resin-impregnated fiber bundle portion comprises fiber bundles and the resin with which the fiber bundles are partially impregnated. The above resin-unimpregnated fiber bundle portion or the above partially resin-impregnated fiber bundle portion has the surface not impregnated with the resin and therefore can be impregnated with a liquid material or a melt. Examples of the above liquid material or the above melt include resins and adhesives.

The fiber-reinforced sheet according to the present invention has a first surface and a second surface opposite to the above first surface.

The fiber-reinforced sheet according to the present invention comprises a sheet body portion and at least one first ridge portion (sometimes referred to as a first ridge portion in order to be distinguished from a second ridge portion described later). The at least one first ridge portion protrudes from the above sheet body portion on the above first surface. The number of the above first ridge portions is preferably plural.

The fiber-reinforced sheet according to the present invention comprises the above resin-unimpregnated fiber bundle portion or the above partially resin-impregnated fiber bundle portion at at least one of the above first surface and the above second surface.

In the present invention, the above configuration is provided, and therefore the strength increases considerably. Particularly, even in a large-sized fiber-reinforced sheet whose dimension in the length direction is 1 m or more, further 3 m or more, the strength increases sufficiently.

Further, in the present invention, the above configuration is provided, and therefore sufficiently high strength can be ensured even if the thickness of the fiber-reinforced sheet is not increased. The above first ridge portion contributes greatly to the improvement of strength.

Further, in the present invention, the above configuration is provided, and therefore by impregnating the above resin-unimpregnated fiber bundle portion or the above partially resin-impregnated fiber bundle portion with a resin, firm attachment can be performed, and firm bonding can be performed. The above resin may be an adhesive. A resin-impregnated fiber bundle is often impregnated with a thermoplastic resin. In the case of a resin-impregnated fiber bundle having a surface impregnated with a thermoplastic resin, it is difficult to firmly attach and bond the surface to an attachment target member (affixation target member). In the present invention, the above resin-unimpregnated fiber bundle portion or the above partially resin-impregnated fiber bundle portion is at the surface, and therefore firm attachment can be performed, and firm bonding can be performed.

The fiber-reinforced sheet according to the present invention may comprise at least one second ridge portion protruding from the above sheet body portion on the above second surface. The number of the above second ridge portions is preferably plural.

From the viewpoint of effectively increasing strength, the fiber-reinforced sheet according to the present invention preferably comprises a resin-impregnated fiber bundle portion having a surface impregnated with the resin. This resin-impregnated fiber bundle portion is a composite fiber bundle portion. The above resin-impregnated fiber bundle portion has a surface impregnated with the resin. The above resin-impregnated fiber bundle portion comprises fiber bundles and the resin with which the fiber bundles are impregnated.

The fiber-reinforced sheet according to the present invention may comprise the above resin-unimpregnated fiber bundle portion or the above partially resin-impregnated fiber bundle portion at only the above first surface, may comprise the above resin-unimpregnated fiber bundle portion or the above partially resin-impregnated fiber bundle portion at only the above second surface, or may comprise the above resin-unimpregnated fiber bundle portion or the above partially resin-impregnated fiber bundle portion at both of the above first surface and the above second surface.

The fiber-reinforced sheet according to the present invention may comprise the above resin-impregnated fiber bundle portion at only the above first surface, may comprise the above resin-impregnated fiber bundle portion at only the above second surface, or may comprise the above resin-impregnated fiber bundle portion at both of the above first surface and the above second surface.

In the fiber-reinforced sheet according to the present invention, only the above sheet body portion may comprise the above resin-unimpregnated fiber bundle portion or the above partially resin-impregnated fiber bundle portion, only the above ridge portion may comprise the above resin-unimpregnated fiber bundle portion or the above partially resin-impregnated fiber bundle portion, or both of the above sheet body portion and the above ridge portion may comprise the above resin-unimpregnated fiber bundle portion or the above partially resin-impregnated fiber bundle portion.

Specific embodiments of the present invention will be described below with reference to the drawings. The different parts in the drawings shown below can be replaced by each other.

FIGS. 1(a), 1(b), and 1(c) are a front cross-sectional view, a top view, and a bottom view showing a fiber-reinforced sheet 1 according to the first embodiment of the present invention. FIG. 1(a) is a cross-sectional view taken along the I-I line in FIG. 1(b).

The fiber-reinforced sheet 1 has a first surface 1a and a second surface 1b opposite to the first surface 1a. The first surface 1a and the second surface 1b are the major surfaces of the fiber-reinforced sheet 1 on both sides opposed to each other. The first surface 1a and the second surface 1b are exposed.

The fiber-reinforced sheet 1 comprises a resin and fiber bundles. The fiber-reinforced sheet 1 comprises non-fiber-bundle-containing resin portions 11 not comprising fiber bundles. The non-fiber-bundle-containing resin portions 11 comprise the above resin. The fiber-reinforced sheet 1 comprises a resin-impregnated fiber bundle portion 12. The resin-impregnated fiber bundle portion 12 comprises the above resin and the above fiber bundles and has a surface impregnated with the above resin. The fiber-reinforced sheet 1 comprises a resin-unimpregnated fiber bundle portion or partially resin-impregnated fiber bundle portion 13. The resin-unimpregnated fiber bundle portion or partially resin-impregnated fiber bundle portion 13 comprises the above fiber bundles and has a surface not impregnated with the resin. The above partially resin-impregnated fiber bundle portion comprises the above resin and the above fiber bundles and has a surface not impregnated with the resin. The resin-impregnated fiber bundle portion 12 and the resin-unimpregnated fiber bundle portion or partially resin-impregnated fiber bundle portion 13 are sheets.

When the above fiber-reinforced sheet has the above non-fiber-bundle-containing resin portions, weight reduction is possible.

The fiber-reinforced sheet 1 is molded so that one resin-impregnated fiber bundle portion 12 has a plurality of linear raised portions on one surface side and has a plurality of linear depressed portions on the other surface side, and the fiber-reinforced sheet 1 is a molded body. The above linear raised portions are ridge portions. The linear depressed portions of the resin-impregnated fiber bundle portion 12 are filled with the resin and specifically filled with the non-fiber-bundle-containing resin portions 11. In the fiber-reinforced sheet 1, one resin-unimpregnated fiber bundle portion or partially resin-impregnated fiber bundle portion 13 is used. One resin-impregnated fiber bundle portion 12 is disposed on one surface of the resin-unimpregnated fiber bundle portion or partially resin-impregnated fiber bundle portion 13. A plurality of the non-fiber-bundle-containing resin portions 11 are partially disposed on one surface of the resin-unimpregnated fiber bundle portion or partially resin-impregnated fiber bundle portion 13, and one resin-impregnated fiber bundle portion 12 is disposed so as to cover the non-fiber-bundle-containing resin portions 11.

The fiber-reinforced sheet 1 comprises a sheet body portion 21 and a plurality of first ridge portions 22. The broken line portion shown in FIG. 1(a) is the boundary between the sheet body portion 21 and the first ridge portions 22.

The first ridge portions 22 are linear raised portions. The first ridge portions 22 are ribs.

The sheet body portion 21 is a surface portion on the second surface 1b side of the fiber-reinforced sheet 1 and is exposed. The plurality of first ridge portions 22 protrude from the sheet body portion 21 on the first surface 1a. The first ridge portions 22 are surface portions on the first surface 1a side of the fiber-reinforced sheet 1 and are exposed.

The sheet body portion 21 has the non-fiber-bundle-containing resin portions 11, the resin-impregnated fiber bundle portion 12, and the resin-unimpregnated fiber bundle portion or partially resin-impregnated fiber bundle portion 13. The sheet body portion 21 has the resin-unimpregnated fiber bundle portion or partially resin-impregnated fiber bundle portion 13 on the second surface 1b side. The sheet body portion 21 has the non-fiber-bundle-containing resin portions 11 and the resin-impregnated fiber bundle portion 12 on the first surface 1a side. The sheet body portion 21 has parts of the non-fiber-bundle-containing resin portions 11 in the fiber-reinforced sheet 1 and part of the resin-impregnated fiber bundle portion 12 in the fiber-reinforced sheet 1.

The first ridge portion 22 has the non-fiber-bundle-containing resin portion 11 and the resin-impregnated fiber bundle portion 12. The first ridge portion 22 has a resin portion not comprising fiber bundles (the non-fiber-bundle-containing resin portion 11). The first ridge portion 22 has part of the non-fiber-bundle-containing resin portion 11 in the fiber-reinforced sheet 1 and part of the resin-impregnated fiber bundle portion 12 in the fiber-reinforced sheet 1. In the first ridge portion 22, the non-fiber-bundle-containing resin portion 11 is positioned inside the first ridge portion 22, and the resin-impregnated fiber bundle portion 12 is positioned in the surface portion of the first ridge portion 22. The resin-impregnated fiber bundle portion 12 is positioned on the first surface 1a side of the non-fiber-bundle-containing resin portion 11. The non-fiber-bundle-containing resin portion 11 is surrounded and covered with the resin-impregnated fiber bundle portion 12, and the resin-unimpregnated fiber bundle portion or partially resin-impregnated fiber bundle portion 13 in the sheet body portion 21.

The cross-sectional shape of the first ridge portion 22 is a rectangular parallelepiped shape. The first ridge portion 22 has the same width on the second surface 1b side and on the first surface 1a side.

In the fiber-reinforced sheet 1, the first ridge portion 22 has a rectilinearly extending portion.

The fiber-reinforced sheet 1 has a curved portion.

The fiber-reinforced sheet 1 has the resin-unimpregnated fiber bundle portion or partially resin-impregnated fiber bundle portion 13 at the second surface 1b. The fiber-reinforced sheet 1, for example, can be affixed and attached to an attachment target member (affixation target member) from the second surface 1b side while the resin-unimpregnated fiber bundle portion or partially resin-impregnated fiber bundle portion 13 is impregnated with a resin or an adhesive.

Figure 2:
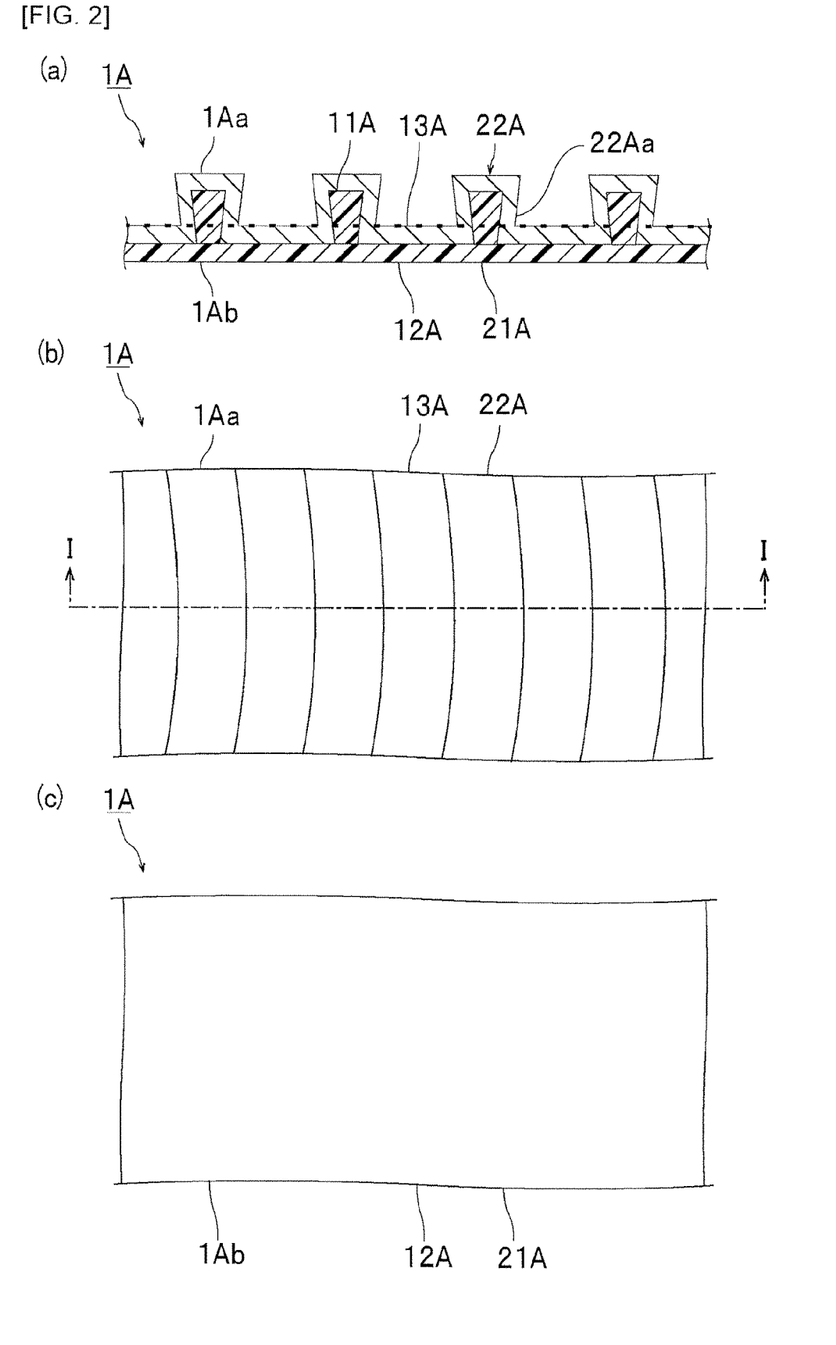
FIGS. 2(a), 2(b), and 2(c) are a front cross-sectional view, a top view, and a bottom view showing a fiber-reinforced sheet according to the second embodiment of the present invention.

FIGS. 2(a), 2(b), and 2(c) are a front cross-sectional view, a top view, and a bottom view showing a fiber-reinforced sheet 1A according to the second embodiment of the present invention. FIG. 2(a) is a cross-sectional view taken along the I-I line in FIG. 2(b).

The fiber-reinforced sheet 1A has a first surface 1Aa and a second surface 1Ab opposite to the first surface 1Aa.

The fiber-reinforced sheet 1A comprises a resin and fiber bundles. The fiber-reinforced sheet 1A comprises non-fiber-bundle-containing resin portions 11A not comprising fiber bundles. The fiber-reinforced sheet 1A comprises a resin-impregnated fiber bundle portion 12A. The fiber-reinforced sheet 1A comprises a resin-unimpregnated fiber bundle portion or partially resin-impregnated fiber bundle portion 13A.

The fiber-reinforced sheet 1A comprises a sheet body portion 21A and a plurality of first ridge portions 22A. The broken line portion shown in FIG. 2(a) is the boundary between the sheet body portion 21A and the first ridge portions 22A.

The fiber-reinforced sheet 1A is molded so that one resin-unimpregnated fiber bundle portion or partially resin-impregnated fiber bundle portion 13A has a plurality of linear raised portions on one surface side and has a plurality of linear depressed portions on the other surface side, and the fiber-reinforced sheet 1A is a molded body. The linear depressed portions of the resin-unimpregnated fiber bundle portion or partially resin-impregnated fiber bundle portion 13A are filled with the non-fiber-bundle-containing resin portions 11A. In the fiber-reinforced sheet 1A, one resin-impregnated fiber bundle portion 12A is used. One resin-unimpregnated fiber bundle portion or partially resin-impregnated fiber bundle portion 13A is disposed on one surface of the resin-impregnated fiber bundle portion 12A. A plurality of the non-fiber-bundle-containing resin portions 11A are partially disposed on one surface of the resin-impregnated fiber bundle portion 12A, and one resin-unimpregnated fiber bundle portion or partially resin-impregnated fiber bundle portion 13A is disposed so as to cover the non-fiber-bundle-containing resin portions 11A.

The sheet body portion 21A is a surface portion on the second surface 1Ab side of the fiber-reinforced sheet 1A and is exposed. The plurality of first ridge portions 22A protrude from the sheet body portion 21A on the first surface 1Aa. The first ridge portions 22A are surface portions on the first surface 1Aa side of the fiber-reinforced sheet 1A and are exposed.

The sheet body portion 21A has the non-fiber-bundle-containing resin portions 11A, the resin-impregnated fiber bundle portion 12A, and the resin-unimpregnated fiber bundle portion or partially resin-impregnated fiber bundle portion 13A. The sheet body portion 21A has the resin-impregnated fiber bundle portion 12A on the second surface 1Ab side. The sheet body portion 21A has the non-fiber-bundle-containing resin portions 11A and the resin-unimpregnated fiber bundle portion or partially resin-impregnated fiber bundle portion 13A on the first surface 1Aa side. The sheet body portion 21A has parts of the non-fiber-bundle-containing resin portions 11A in the fiber-reinforced sheet 1A and part of the resin-unimpregnated fiber bundle portion or partially resin-impregnated fiber bundle portion 13A in the fiber-reinforced sheet 1A.

The first ridge portion 22A has the non-fiber-bundle-containing resin portion 11A and the resin-unimpregnated fiber bundle portion or partially resin-impregnated fiber bundle portion 13A. The first ridge portion 22A has part of the non-fiber-bundle-containing resin portion 11A in the fiber-reinforced sheet 1A and part of the resin-unimpregnated fiber bundle portion or partially resin-impregnated fiber bundle portion 13A in the fiber-reinforced sheet 1A. In the first ridge portion 22A, the non-fiber-bundle-containing resin portion 11A is positioned inside the first ridge portion 22A, and the resin-unimpregnated fiber bundle portion or partially resin-impregnated fiber bundle portion 13A is positioned in the surface portion of the first ridge portion 22A. The resin-unimpregnated fiber bundle portion or partially resin-impregnated fiber bundle portion 13A is positioned on the first surface 1Aa side of the non-fiber-bundle-containing resin portion 11A. The non-fiber-bundle-containing resin portion 11A is surrounded and covered with the resin-unimpregnated fiber bundle portion or partially resin-impregnated fiber bundle portion 13A, and the resin-impregnated fiber bundle portion 12A in the sheet body portion 21A.

The side surfaces of the first ridge portion 22A have recesses 22Aa. The width of the first ridge portion 22A increases at the tip on the first surface 1Aa side. The first ridge portion 22A has a region in which the width increases from the second surface 1Ab side toward the first surface 1Aa side. The cross-sectional shape of the first ridge portion 22A is an inverted trapezoid shape.

In the fiber-reinforced sheet 1A, the recesses 22Aa can be filled with a resin or an adhesive, and firm adhesion can be performed by an anchor effect.

The fiber-reinforced sheet 1A has regions in which the width increases from the second surface 1Ab side toward the first surface 1Aa side, and therefore the area of the tips of the first surface 1Aa attached to an attachment target member (affixation target member) can be increased, and adhesion can be easily performed, and firm adhesion can be performed.

In order to perform firm adhesion, the cross-sectional shape of the above first ridge portion may be T-shaped, and recesses similar to those of the above first ridge portion can also be formed in a second ridge portion described later.

The recesses of the above first ridge portions can be easily formed, for example, by crushing the fiber-reinforced sheet from the first surface side. In addition, during the molding of the resin-impregnated fiber bundle portion or the resin-unimpregnated fiber bundle portion or the above partially resin-impregnated fiber bundle portion, molding in which the recesses of the above first ridge portions are formed may be performed.

In the fiber-reinforced sheet 1A, the first ridge portion 22A has a curvilinearly extending portion.

The above first ridge portion may extend rectilinearly or curvilinearly.

The fiber-reinforced sheet 1A is planar and is not curved.

The above fiber-reinforced sheet may be planar or may have a curved portion. Further, the above fiber-reinforced sheet may have other shapes.

The fiber-reinforced sheet 1A has the resin-unimpregnated fiber bundle portion or partially resin-impregnated fiber bundle portion 13A at the first surface 1Aa. The fiber-reinforced sheet 1A, for example, can be affixed and attached to an attachment target member (affixation target member) from the first surface 1Aa side while the resin-unimpregnated fiber bundle portion or partially resin-impregnated fiber bundle portion 13A is impregnated with a resin or an adhesive.

When the fiber-reinforced sheet 1A is attached to an attachment target member (affixation target member) from the first surface 1Aa side while the resin-unimpregnated fiber bundle portion or partially resin-impregnated fiber bundle portion 13A is impregnated with a resin or an adhesive, the gaps between the first ridge portions 22A after the affixation may be filled with a material such as a foam. The material with which the gaps between the first ridge portions 22A after the affixation are filled may regulate the excessive flow of the resin.

Figure 3:
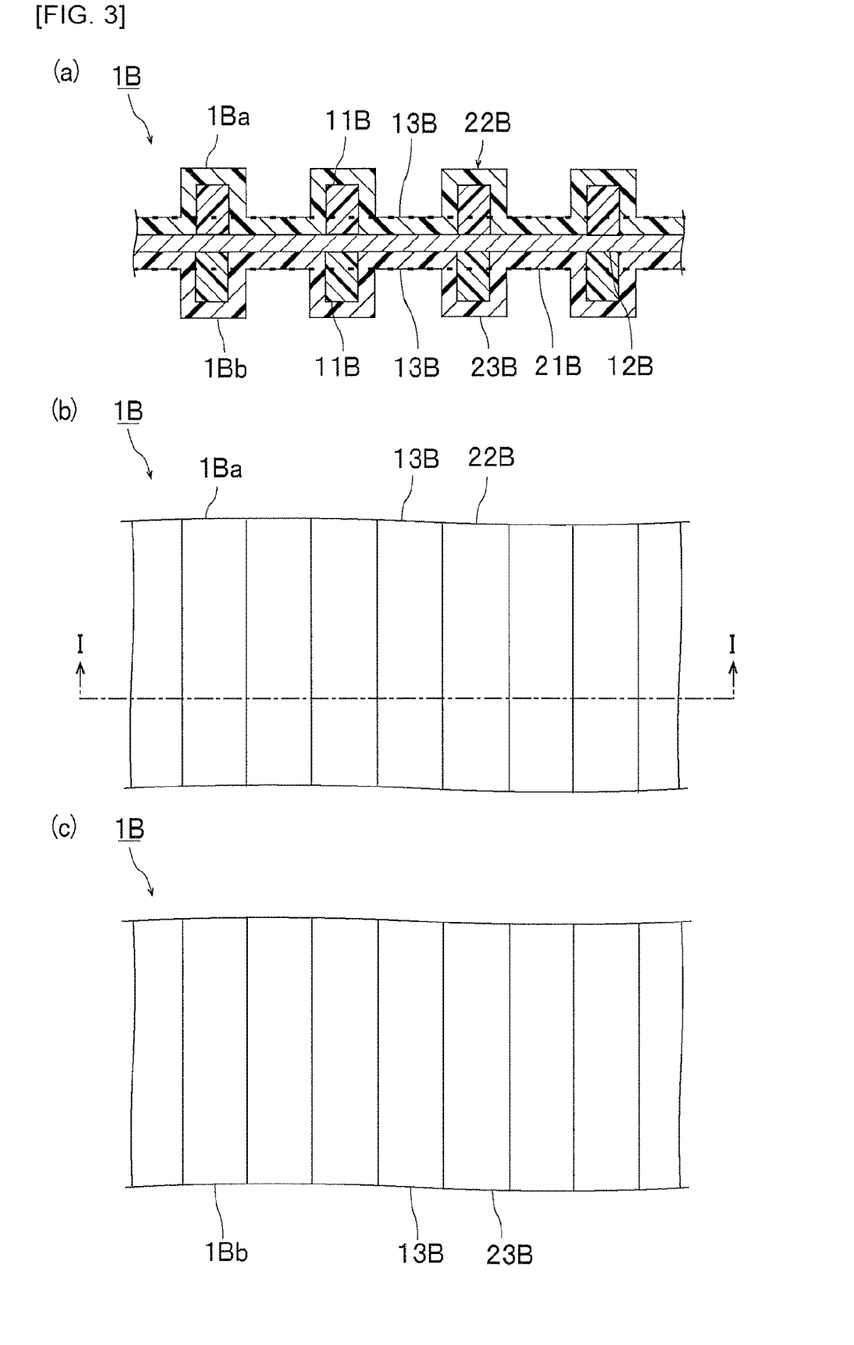
FIGS. 3(a), 3(b), and 3(c) are a front cross-sectional view, a top view, and a bottom view showing a fiber-reinforced sheet according to the third embodiment of the present invention.

FIGS. 3(a), 3(b), and 3(c) are a front cross-sectional view, a top view, and a bottom view showing a fiber-reinforced sheet 1C according to the third embodiment of the present invention. FIG. 3(a) is a cross-sectional view taken along the I-I line in FIG. 3(b).

The fiber-reinforced sheet 1B has a first surface 1Ba and a second surface 1Bb opposite to the first surface 1Ba.

The fiber-reinforced sheet 1B comprises a resin and fiber bundles. The fiber-reinforced sheet 1B comprises non-fiber-bundle-containing resin portions 11B not comprising fiber bundles. The fiber-reinforced sheet 1B comprises a resin-impregnated fiber bundle portion 12B. The fiber-reinforced sheet 1B comprises resin-unimpregnated fiber bundle portions or partially resin-impregnated fiber bundle portions 13B.

The fiber-reinforced sheet 1B comprises a sheet body portion 21B, a plurality of first ridge portions 22B, and a plurality of second ridge portions 23B. The two broken line portions shown in FIG. 3(a) are the boundary between the sheet body portion 21B and the first ridge portions 22B and the boundary between the sheet body portion 21B and the second ridge portions 23B.

The fiber-reinforced sheet 1B is molded so that two resin-unimpregnated fiber bundle portions or partially resin-impregnated fiber bundle portions 13B each have a plurality of linear raised portions on one surface side and have a plurality of linear depressed portions on the other surface side, and the fiber-reinforced sheet 1B is a molded body. The linear depressed portions of the resin-unimpregnated fiber bundle portions or partially resin-impregnated fiber bundle portions 13B are filled with the non-fiber-bundle-containing resin portions 11B. In the fiber-reinforced sheet 1B, one resin-impregnated fiber bundle portion 12B is used. One resin-unimpregnated fiber bundle portion or partially resin-impregnated fiber bundle portion 13B is disposed on one surface of the resin-impregnated fiber bundle portion 12B. One resin-unimpregnated fiber bundle portion or partially resin-impregnated fiber bundle portion 13B is disposed on the other surface of the resin-impregnated fiber bundle portion 12B. A plurality of the non-fiber-bundle-containing resin portions 11B are partially disposed on one surface of the resin-impregnated fiber bundle portion 12B, and one resin-unimpregnated fiber bundle portion or partially resin-impregnated fiber bundle portion 13B is disposed so as to cover the non-fiber-bundle-containing resin portions 11B. A plurality of the non-fiber-bundle-containing resin portions 11B are partially disposed on the other surface of the resin-impregnated fiber bundle portion 12B, and one resin-unimpregnated fiber bundle portion or partially resin-impregnated fiber bundle portion 13B is disposed so as to cover the non-fiber-bundle-containing resin portions 11B.

The sheet body portion 21B is positioned in the center of the thickness direction of the fiber-reinforced sheet 1B. The plurality of first ridge portions 22B protrude from the sheet body portion 21B on the first surface 1Ba. The first ridge portions 22B are surface portions on the first surface 1Ba side of the fiber-reinforced sheet 1B and are exposed. The plurality of second ridge portions 23B protrude from the sheet body portion 21B on the second surface 1Bb. The second ridge portions 23B are surface portions on the second surface 1Bb side of the fiber-reinforced sheet 1B and are exposed.

The sheet body portion 21B has the non-fiber-bundle-containing resin portions 11B, the resin-impregnated fiber bundle portion 12B, and the resin-unimpregnated fiber bundle portions or partially resin-impregnated fiber bundle portions 13B. The sheet body portion 21B has the non-fiber-bundle-containing resin portions 11B and the resin-unimpregnated fiber bundle portion or partially resin-impregnated fiber bundle portion 13B on the second surface 1Bb side. The sheet body portion 21B has the non-fiber-bundle-containing resin portions 11B and the resin-unimpregnated fiber bundle portion or partially resin-impregnated fiber bundle portion 13B on the first surface 1Ba side. The sheet body portion 21B has the resin-impregnated fiber bundle portion 12B in the center of the thickness direction. The sheet body portion 21B has parts of the non-fiber-bundle-containing resin portions 11B in the fiber-reinforced sheet 1B and parts of the resin-unimpregnated fiber bundle portions or partially resin-impregnated fiber bundle portions 13B in the fiber-reinforced sheet 1B.

The first ridge portion 22B has the non-fiber-bundle-containing resin portion 11B and the resin-unimpregnated fiber bundle portion or partially resin-impregnated fiber bundle portion 13B. The first ridge portion 22B has part of the non-fiber-bundle-containing resin portion 11B in the fiber-reinforced sheet 1B and part of the resin-unimpregnated fiber bundle portion or partially resin-impregnated fiber bundle portion 13B in the fiber-reinforced sheet 1B. In the first ridge portion 22B, the non-fiber-bundle-containing resin portion 11B is positioned inside the first ridge portion 22B, and the resin-unimpregnated fiber bundle portion or partially resin-impregnated fiber bundle portion 13B is positioned in the surface portion of the first ridge portion 22B. The resin-unimpregnated fiber bundle portion or partially resin-impregnated fiber bundle portion 13B is positioned on the first surface 1Ba side of the non-fiber-bundle-containing resin portion 11B. The non-fiber-bundle-containing resin portion 11B is surrounded and covered with the resin-unimpregnated fiber bundle portion or partially resin-impregnated fiber bundle portion 13B on the first surface 1Ba side.

The second ridge portion 23B has the non-fiber-bundle-containing resin portion 11B and the resin-unimpregnated fiber bundle portion or partially resin-impregnated fiber bundle portion 13B. In the second ridge portion 23B, the non-fiber-bundle-containing resin portion 11B is positioned inside the second ridge portion 23B, and the resin-unimpregnated fiber bundle portion or partially resin-impregnated fiber bundle portion 13B is positioned in the surface portion of the second ridge portion 23B. The resin-unimpregnated fiber bundle portion or partially resin-impregnated fiber bundle portion 13B is positioned on the second surface 1Bb side of the non-fiber-bundle-containing resin portion 11B. The non-fiber-bundle-containing resin portion 11B is surrounded and covered with the resin-unimpregnated fiber bundle portion or partially resin-impregnated fiber bundle portion 13B on the second surface 1Bb side.

The cross-sectional shape of the first ridge portion 22B is a rectangular parallelepiped shape. The first ridge portion 22B has the same width on the second surface 1Bb side and on the first surface 1Ba side. The cross-sectional shape of the second ridge portion 23B is a rectangular parallelepiped shape. The second ridge portion 23B has the same width on the first surface 1Ba side and on the second surface 1Bb side.

In the fiber-reinforced sheet 1B, the first ridge portion 22B has a rectilinearly extending portion.

The fiber-reinforced sheet 1B is planar and is not curved.

The fiber-reinforced sheet 1B has the resin-unimpregnated fiber bundle portion or partially resin-impregnated fiber bundle portion 13B at the first surface 1Ba. The fiber-reinforced sheet 1B, for example, can be affixed and attached to an attachment target member (affixation target member) from the first surface 1Ba side while the resin-unimpregnated fiber bundle portion or partially resin-impregnated fiber bundle portion 13B is impregnated with a resin or an adhesive.

The fiber-reinforced sheet 1B also has the resin-unimpregnated fiber bundle portion or partially resin-impregnated fiber bundle portion 13B at the second surface 1Bb. The fiber-reinforced sheet 1B, for example, can also be affixed and attached to an attachment target member (affixation target member) from the second surface 1Bb side while the resin-unimpregnated fiber bundle portion or partially resin-impregnated fiber bundle portion 13B is impregnated with a resin or an adhesive.

The fiber-reinforced sheet 1B can be affixed and attached to attachment target members (affixation target members) on both surfaces.

In the fiber-reinforced sheet 1B, the direction in which the first ridge portions 22B extend and the direction in which the second ridge portions 23B extend are parallel. From the viewpoint of still further increasing strength, the direction in which the above first ridge portions extend and the direction in which the above second ridge portions extend are preferably shifted from each other and are preferably directions shifted from each other by 5° or more, more preferably directions shifted from each other by 10° or more. From the viewpoint of still further increasing bending workability, the direction in which the above first ridge portions extend and the direction in which the above second ridge portions extend are preferably parallel or directions shifted from each other by 10° or less. When the direction in which the above first ridge portions extend and the direction in which the above second ridge portions extend are shifted from each other, they are more preferably directions shifted from each other by 5° or less.

Figure 4:
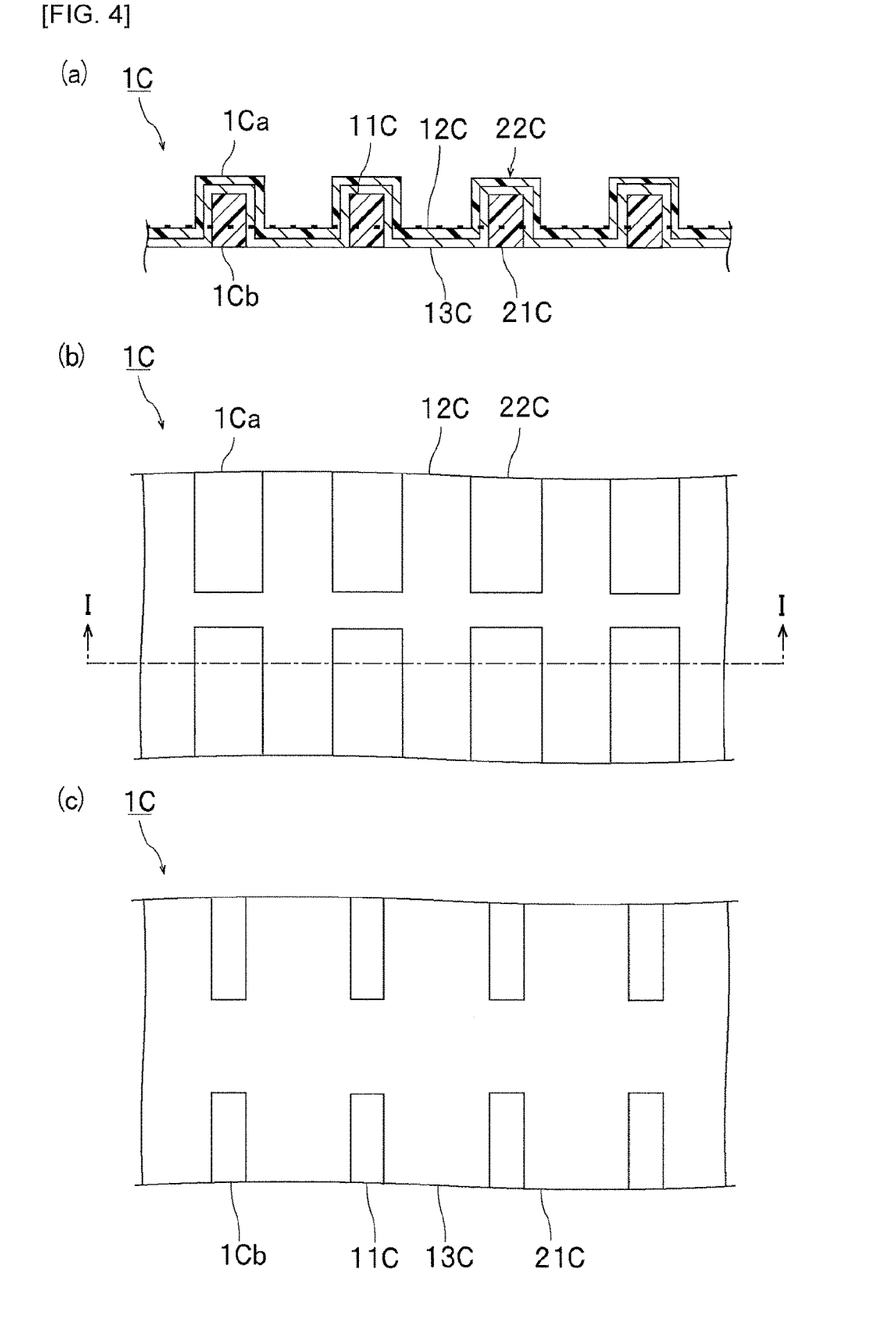
FIGS. 4(a), 4(b), and 4(c) are a front cross-sectional view, a top view, and a bottom view showing a fiber-reinforced sheet according to the fourth embodiment of the present invention.

FIGS. 4(a), 4(b), and 4(c) are a front cross-sectional view, a top view, and a bottom view showing a fiber-reinforced sheet 1B according to the fourth embodiment of the present invention. FIG. 4(a) is a cross-sectional view taken along the I-I line in FIG. 4(b).

The fiber-reinforced sheet 1C has a first surface 1Ca and a second surface 1Cb opposite to the first surface 1Ca.

The fiber-reinforced sheet 1C comprises a resin and fiber bundles. The fiber-reinforced sheet 1C comprises non-fiber-bundle-containing resin portions 11C not comprising fiber bundles. The fiber-reinforced sheet 1C comprises a resin-impregnated fiber bundle portion 12C. The fiber-reinforced sheet 1C comprises a resin-unimpregnated fiber bundle portion or partially resin-impregnated fiber bundle portion 13C as the above fiber bundles.

The fiber-reinforced sheet 1C comprises a sheet body portion 21C and a plurality of first ridge portions 22C. The broken line portion shown in FIG. 4(a) is the boundary between the sheet body portion 21C and the first ridge portions 22C.

The fiber-reinforced sheet 1C is molded so that one resin-unimpregnated fiber bundle portion or partially resin-impregnated fiber bundle portion 13C has a plurality of linear raised portions on one surface side and has a plurality of linear depressed portions on the other surface side, and the fiber-reinforced sheet 1C is a molded body. The linear depressed portions of the resin-unimpregnated fiber bundle portion or partially resin-impregnated fiber bundle portion 13C are filled with the non-fiber-bundle-containing resin portions 11C. The fiber-reinforced sheet 1C is molded so that one resin-impregnated fiber bundle portion 12C has a plurality of linear raised portions on one surface side and has a plurality of linear depressed portions on the other surface side, and the fiber-reinforced sheet 1C is a molded body. The linear raised portions of the resin-unimpregnated fiber bundle portion or partially resin-impregnated fiber bundle portion 13C are inserted into the linear depressed portions of the resin-impregnated fiber bundle portion 12C. In the fiber-reinforced sheet 1C, one resin-unimpregnated fiber bundle portion or partially resin-impregnated fiber bundle portion 13C is used. One resin-impregnated fiber bundle portion 12C is disposed on one surface of the resin-unimpregnated fiber bundle portion or partially resin-impregnated fiber bundle portion 13C. A plurality of the non-fiber-bundle-containing resin portions 11C are disposed at intervals. One resin-unimpregnated fiber bundle portion or partially resin-impregnated fiber bundle portion 13C is disposed so as to cover the non-fiber-bundle-containing resin portions 11C, and one resin-impregnated fiber bundle portion 12C is disposed so as to cover the resin-unimpregnated fiber bundle portion or partially resin-impregnated fiber bundle portion 13C.

The sheet body portion 21C is a surface portion on the second surface 1Cb side of the fiber-reinforced sheet 1C and is exposed. The plurality of first ridge portions 22C protrude from the sheet body portion 21C on the first surface 1Ca. The first ridge portions 22C are surface portions on the first surface 1Ca side of the fiber-reinforced sheet 1C and are exposed.

The sheet body portion 21C has the non-fiber-bundle-containing resin portions 11C, the resin-impregnated fiber bundle portion 12C, and the resin-unimpregnated fiber bundle portion or partially resin-impregnated fiber bundle portion 13C. The sheet body portion 21C has the non-fiber-bundle-containing resin portions 11C and the resin-unimpregnated fiber bundle portion or partially resin-impregnated fiber bundle portion 13C on the second surface 1Cb side. The sheet body portion 21C has the non-fiber-bundle-containing resin portions 11C, the resin-impregnated fiber bundle portion 12C, and the resin-unimpregnated fiber bundle portion or partially resin-impregnated fiber bundle portion 13C on the first surface 1Ca side. The sheet body portion 21C has parts of the non-fiber-bundle-containing resin portions 11C in the fiber-reinforced sheet 1C, part of the resin-impregnated fiber bundle portion 12C in the fiber-reinforced sheet 1C, and part of the resin-unimpregnated fiber bundle portion or partially resin-impregnated fiber bundle portion 13C in the fiber-reinforced sheet 1C.

The first ridge portion 22C has the non-fiber-bundle-containing resin portion 11C, the resin-impregnated fiber bundle portion 12C, and the resin-unimpregnated fiber bundle portion or partially resin-impregnated fiber bundle portion 13C. The first ridge portion 22C has part of the non-fiber-bundle-containing resin portion 11C in the fiber-reinforced sheet 1C, part of the resin-impregnated fiber bundle portion 12C in the fiber-reinforced sheet 1C, and part of the resin-unimpregnated fiber bundle portion or partially resin-impregnated fiber bundle portion 13C in the fiber-reinforced sheet 1C. In the first ridge portion 22C, the non-fiber-bundle-containing resin portion 11C is positioned inside the first ridge portion 22C, and the resin-impregnated fiber bundle portion 12C is positioned in the surface portion of the first ridge portion 22C. The resin-unimpregnated fiber bundle portion or partially resin-impregnated fiber bundle portion 13C is positioned between the non-fiber-bundle-containing resin portion 11C and the resin-impregnated fiber bundle portion 12C. The resin-impregnated fiber bundle portion 12C is positioned on the first surface 1Ca side of the non-fiber-bundle-containing resin portion 11C.

The cross-sectional shape of the first ridge portion 22C is a rectangular parallelepiped shape. The first ridge portion 22C has the same width on the second surface 1Cb side (the base of the first ridge portion 22C) and on the first surface 1Ca side.

In the fiber-reinforced sheet 1C, the first ridge portion 22C has a rectilinearly extending portion.

As shown in FIG. 4(b), the first ridge portion 22C is not entirely provided from one end to the other end of the fiber-reinforced sheet 1C.

The fiber-reinforced sheet 1C is planar and is not curved.

The fiber-reinforced sheet 1C has the resin-unimpregnated fiber bundle portion or partially resin-impregnated fiber bundle portion 12C at the first surface 1Ca. The fiber-reinforced sheet 1C, for example, can be affixed and attached to an attachment target member (affixation target member) from the first surface 1Ca side while the resin-unimpregnated fiber bundle portion or partially resin-impregnated fiber bundle portion 12C is impregnated with a resin or an adhesive.

(Other Details of Fiber-Reinforced Sheet)

Resin:

The above resin is preferably a thermosetting resin, a cured product of a thermosetting resin, or a thermoplastic resin and preferably a thermoplastic resin.

As the above thermoplastic resin, thermoplastic resins that have suitable viscosity under necessary heating conditions are preferred. Specific examples of the above thermoplastic resin include polyolefin resins, polyamide resins, polycarbonate resins, polystyrene resins, and polyester resins. Examples of the above polyolefin resins include polyethylene resins and polypropylene resins. Examples of the above polyamide resins include aliphatic polyamide resins and specifically include polyamide 66, polyamide 6, and polyamide 12. Examples of the above polystyrene resins include styrene polymer resins, AS resins, and ABS resins. Examples of the above polyester resins include aliphatic polyester resins and specifically include polylactic resins.

From the viewpoint of excellent physical properties and from the viewpoint of making resin impregnation properties and the like good, polyolefin resins are preferred.

In the above fiber-reinforced sheet, bubbles may be contained in the above resin. Containing bubbles contributes to weight reduction and is particularly advantageous to a large-sized fiber-reinforced sheet.

Fiber Bundles:

The fiber bundles are, for example, reinforcing fiber bundles. The elastic modulus of the fiber bundles, particularly the elastic modulus of the reinforcing fiber bundles, is relatively high.

Specific examples of the material of the fiber bundles include glass fibers and carbon fibers. From the viewpoint of increasing strength, the material of the fiber bundles is preferably glass fibers or carbon fibers.

Preferred examples of the above carbon fibers include PAN-based carbon fibers and PITCH-based carbon fibers. Preferred examples of the above glass fibers include E-glass fibers.

The form of the above fiber bundles may be a plain weave, a twill weave, or a sateen weave. Unwoven fiber bundles may be used.

The average fiber diameter in the above fiber bundle is preferably 6 μm or more and preferably 27 μm or less. The above average fiber diameter is obtained by averaging fiber diameters (maximum diameters) in any 10 or more places.

The number of fibers in the above fiber bundle is not particularly limited. The number of fibers in the above fiber bundle is preferably 1000 or more and preferably 50000 or less. When the material of the above fiber bundles is carbon fibers, the number of fibers in the above fiber bundle is preferably 1000 or more and preferably 50000 or less. When the material of the above fiber bundles is glass fibers, the number of fibers in the above fiber bundle is preferably 1000 or more and preferably 20000 or less.

The above fiber bundle is a bundle of a plurality of fibers. The form of the above fiber bundles is not particularly limited. The above fiber bundles may be a fiber sheet formed by stitching or the like.

One of the indicators of the performance of the fiber sheet is weight per unit area (usually 1 m square), and the performance is expressed as basis weight. The basis weight of the fiber sheet is preferably 100 g/m² or more and preferably 400 g/m² or less. When the basis weight is equal to or more than the above lower limit, the strength of the fiber bundles increases still further. When the basis weight is equal to or less than the above upper limit, the resin impregnation properties increase still further.

Tension is applied to the fibers constituting the fiber bundles. When tension is applied to the fibers, the interfiber distance tends to decrease. Therefore, the fiber bundles are preferably subjected to treatment for increasing the interfiber distance. The above fiber bundles preferably comprise spacer particles increasing the interfiber distance. By increasing the interfiber distance in this manner, resin impregnation is easy even if high tension is applied to the fibers, because the interfiber distance is previously increased. In addition, the interfiber distance is less likely to decrease even if tension is applied to the fibers.

The material of the above spacers is not particularly limited. The material of the above spacer particles is preferably such a material that the spacer particles do not deform excessively due to the temperature and pressure during impregnation.

As the material of the above spacers, naphthoxazine resins are preferred. The naphthoxazine resins are likely to carbonize, and less likely to soften excessively even when high temperature or pressure is applied. Therefore, the interfiber distance is sufficiently ensured, and the resin impregnation properties increase still further.

The above spacer particles are preferably naphthoxazine resin particles or inorganic particles. The above spacer particles are preferably inorganic particles, more preferably inorganic particles excluding metal particles. Regarding the above inorganic particles, an inorganic particle dispersion in a colloidal state may be subjected to treatment such as salting out to aggregate the particles for adjustment for particles having a size suitable as spacers.

Fiber-Reinforced Sheet:

From the viewpoint of effectively increasing strength, the width of the above ridge portion is preferably 1 cm or more, more preferably 5 cm or more, further preferably 10 cm or more, and particularly preferably 30 cm or more. From the viewpoint of making the deformation of the fiber-reinforced sheet easy, the width of the above ridge portion is preferably 5 m or less, more preferably 1 m or less, further preferably 50 cm or less, and particularly preferably 10 cm or less.

From the viewpoint of effectively increasing strength, the length of the above ridge portion is preferably 10 cm or more, more preferably 50 cm or more, further preferably 1 m or more, particularly preferably 3 m or more, and most preferably 10 m or more. From the viewpoint of making the deformation of the fiber-reinforced sheet easy, the length of the above ridge portion is preferably 100 m or less, more preferably 10 m or less, further preferably 5 m or less, and particularly preferably 1 m or less.

Since high strength is obtained even if the thickness is decreased, the height of the above ridge portion is preferably 50 cm or less, more preferably 30 cm or less, and further preferably 5 cm or less. From the viewpoint of still further increasing strength, the height of the above ridge portion is preferably 5 mm or more, more preferably 1 cm or more, and further preferably 5 cm or more.

From the viewpoint of effectively increasing strength, the dimension of the above fiber-reinforced sheet in the length direction is preferably 10 cm or more, more preferably 50 cm or more, further preferably 1 m or more, particularly preferably 3 m or more, and most preferably 10 m or more. The dimension of the above fiber-reinforced sheet in the length direction is preferably 100 m or less, more preferably 10 m or less, further preferably 5 m or less, and particularly preferably 1 m or less from the viewpoint of making the deformation of the fiber-reinforced sheet easy.

Since high strength is obtained even if the thickness is decreased, the average thickness of the above fiber-reinforced sheet is preferably 1 m or less, more preferably 50 cm or less, and further preferably 10 cm or less. From the viewpoint of still further increasing strength, the average thickness of the above fiber-reinforced sheet is preferably 1 cm or more, more preferably 5 cm or more, and further preferably 10 cm or more.

From the viewpoint of suppressing variations in strength in the above fiber-reinforced sheet, directions in which a plurality of the above first ridge portions adjacent to each other extend are preferably parallel or directions shifted from each other by 10° or less. From the viewpoint of suppressing variations in strength in the above fiber-reinforced sheet, directions in which a plurality of the above second ridge portions adjacent to each other extend are preferably parallel or directions shifted from each other by 10° or less. When the directions in which the plurality of the above first ridge portions adjacent to each other extend are shifted from each other, they are more preferably shifted from each other by 5° or less.

One of the above fiber-reinforced sheet can be used, or two or more of the above fiber-reinforced sheets can also be laminated and used.

Method for Manufacturing Fiber-Reinforced Sheet:

As a method for molding the above fiber-reinforced sheet, examples of the method, particularly when a thermoplastic resin is used as the above resin, include a method of performing roll forming in a state in which the resin is softened by heating. In order to fill the ridge portions with the resin, a method of extruding the resin filled into a mold using an extruder, and taking off the extrudate with cooling can be used. Examples of a method for bringing the ridge portions into a curved state include a method of, after taking off the extrudate, bending the extrudate in a state in which the resin is softened or in a state in which the crystallization of the resin is not completed.

Examples of other methods for bringing the ridge portions into a curved state include a method of curving the ridge portions by changing the heat expansion coefficients of the outer surfaces constituting the ridge portions by a method of differentiating the fiber content of the outer surfaces or a method of differentiating the orientation of the fibers at the outer surfaces. For example, when the fiber content of one surface is increased, and the fiber content of one surface is decreased, the surface with low fiber content is more likely to shrink due to the crystallization of the resin, and therefore the ridge portion can be curved so that the surface side with low fiber content is depressed.

Examples of a specific method for manufacturing a fiber-reinforced sheet include a method for manufacturing a fiber-reinforced sheet, comprising the molding step of molding a resin-impregnated fiber bundle portion impregnated with a resin, or a resin-unimpregnated fiber bundle portion having a surface not impregnated with a resin or a partially resin-impregnated fiber bundle portion having a surface not impregnated with a resin, so as to form a plurality of ridge portions on one surface side, thereby obtaining a molded body, and, when using the above resin-impregnated fiber bundle portion among the above resin-impregnated fiber bundle portion and the above resin-unimpregnated fiber bundle portion or the above partially resin-impregnated fiber bundle portion, comprising the disposing step of disposing on a surface of the above molded body the resin-unimpregnated fiber bundle portion having the surface not impregnated with the resin or the partially resin-impregnated fiber bundle portion having the surface not impregnated with the resin. When the above resin-unimpregnated fiber bundle portion or the above partially resin-impregnated fiber bundle portion is used, the above disposing step need not be performed.

In the above method for manufacturing a fiber-reinforced sheet, the above resin-impregnated fiber bundle portion is preferably used among the above resin-impregnated fiber bundle portion and the above resin-unimpregnated fiber bundle portion or the above partially resin-impregnated fiber bundle portion. In the above method for manufacturing a fiber-reinforced sheet, in the above molding step, the above resin-impregnated fiber bundle portion may be used, or the above resin-unimpregnated fiber bundle portion or the above partially resin-impregnated fiber bundle portion may be used. From the viewpoint of effectively increasing strength, in the above molding step, the above resin-impregnated fiber bundle portion is preferably used.

From the viewpoint of forming the above first ridge portions in a good shape and effectively increasing strength, in the above molding step, molding is preferably performed by a deformed roll.

From the viewpoint of easily performing molding, in the above molding step, molding is preferably performed so that a plurality of linear depressed portions are formed on the other surface side.

The above method for manufacturing a fiber-reinforced sheet preferably comprises the filling step of filling the above linear depressed portions of the above molded body with the resin. By filling the above linear depressed portions with the resin, weight reduction and the improvement of strength can both be achieved.

Applications:

By using the above fiber-reinforced sheet, ridge portion (rib) structures can be provided in a predetermined direction on surfaces of various structures. The strength can be significantly improved, particularly in the direction in which the ridge portions extend. When it is desired to increase the strength in a direction shifted from the direction in which the ridge portions extend, for example, a plate material can be fitted in. Based on the ridge portion (rib) structures provided by the above fiber-reinforced sheet, free reinforcement is possible.

In the present invention, by making the plurality of ridge portions (ribs or the like) parallel (including generally parallel), the strength in the direction can be improved. In some cases, the fiber-reinforced sheet can be applied and developed as a bar in the form of one ridge portion. In these cases, the fiber-reinforced sheet having the plurality of ridge portions may be cut to obtain a fiber-reinforced sheet having one ridge portion. Even the fiber-reinforced sheet having one ridge portion can be firmly attached to another bar (a metal bar, a fiber-reinforced plastic bar, or the like) and used by impregnating the above resin-unimpregnated fiber bundle portion or the above partially resin-impregnated fiber bundle portion with a resin or an adhesive.

The above fiber-reinforced sheet can be attached to an attachment target portion and used, in various applications. Examples of the applications of the above fiber-reinforced sheet include windmill blades, aircraft, ships, vehicles, floorboards and roofing materials for civil engineering and construction, and pipes. The above fiber-reinforced sheet is preferably used for a windmill blade and specifically preferably used as a reinforcing member of a windmill blade. The above resin sheet can also be used as a reinforcing member of a pipeline for natural gas.

The above fiber-reinforced sheet can be preferably used for obtaining a structure in which the above fiber resin portion is attached to a surface of an attachment target member (structure body). Examples of the above structure include windmill blades, aircraft, ships, vehicles, floorboards and roofing materials for civil engineering and construction, and pipes.

A method for manufacturing the above structure preferably comprises the step of impregnating the above resin-unimpregnated fiber bundle portion or the above partially resin-impregnated fiber bundle portion with part of a resin using the above fiber-reinforced sheet, and forming a structure body from the resin, and forming a fiber resin portion from the above fiber-reinforced sheet to obtain a structure in which the above fiber resin portion is attached to a surface of the above structure body.

In the method for manufacturing the above structure, it is preferred that a molded body that is a resin-impregnated fiber bundle portion impregnated with a resin, or a resin-unimpregnated fiber bundle portion having a surface not impregnated with a resin or a partially resin-impregnated fiber bundle portion having a surface not impregnated with a resin and has a plurality of ridge portions on one surface side is used, and when the above molded body is the above resin-impregnated fiber bundle portion among the above resin-impregnated fiber bundle portion and the above resin-unimpregnated fiber bundle portion or the above partially resin-impregnated fiber bundle portion, the method comprises the disposing step of disposing on a surface of the above molded body the resin-unimpregnated fiber bundle portion having the surface not impregnated with the resin or the above partially resin-impregnated fiber bundle portion. When the above molded body is the above resin-unimpregnated fiber bundle portion or the above partially resin-impregnated fiber bundle portion, the above disposing step need not be performed.

In the method for manufacturing the above structure, a molded body that is the above resin-impregnated fiber bundle portion may be used, or a molded body that is the above resin-unimpregnated fiber bundle portion or the above partially resin-impregnated fiber bundle portion may be used. From the viewpoint of effectively increasing strength, in the above molding step, the molded body that is the above resin-impregnated fiber bundle portion is preferably used.

The method for manufacturing the above structure preferably comprises the step of impregnating the above resin-unimpregnated fiber bundle portion or the above partially resin-impregnated fiber bundle portion with part of a resin, and forming a structure body from the resin, and forming a fiber resin portion from the above fiber-reinforced sheet to obtain a structure in which the above fiber resin portion is attached to a surface of the above structure body.

From the viewpoint of efficiently impregnating the resin, still further suppressing peeling, and effectively improving strength, in the method for manufacturing the above structure, it is preferred that the above resin-unimpregnated fiber bundle portion or the above partially resin-impregnated fiber bundle portion is impregnated with the resin under degassing.

From the viewpoint of efficiently impregnating the resin, still further suppressing peeling, and effectively improving strength, in the method for manufacturing the above structure, it is preferred that the above resin-unimpregnated fiber bundle portion or the above partially resin-impregnated fiber bundle portion is impregnated with the resin in a vacuum bag under degassing.

(Windmill Blade)

The above structure is preferably a windmill blade. The above windmill blade comprises a windmill blade body and a fiber resin portion formed from the above fiber-reinforced sheet. In the above windmill blade, the above fiber resin portion is attached to a surface of the above windmill blade body. From the viewpoint of effectively suppressing the detachment of the above fiber resin portion, in the above windmill blade, it is preferred that the above fiber resin portion is attached to a surface of the above windmill blade body in a state in which the above resin-unimpregnated fiber bundle portion or the above partially resin-impregnated fiber bundle portion in the above fiber-reinforced sheet is impregnated with a resin or an adhesive.

Figure 1:
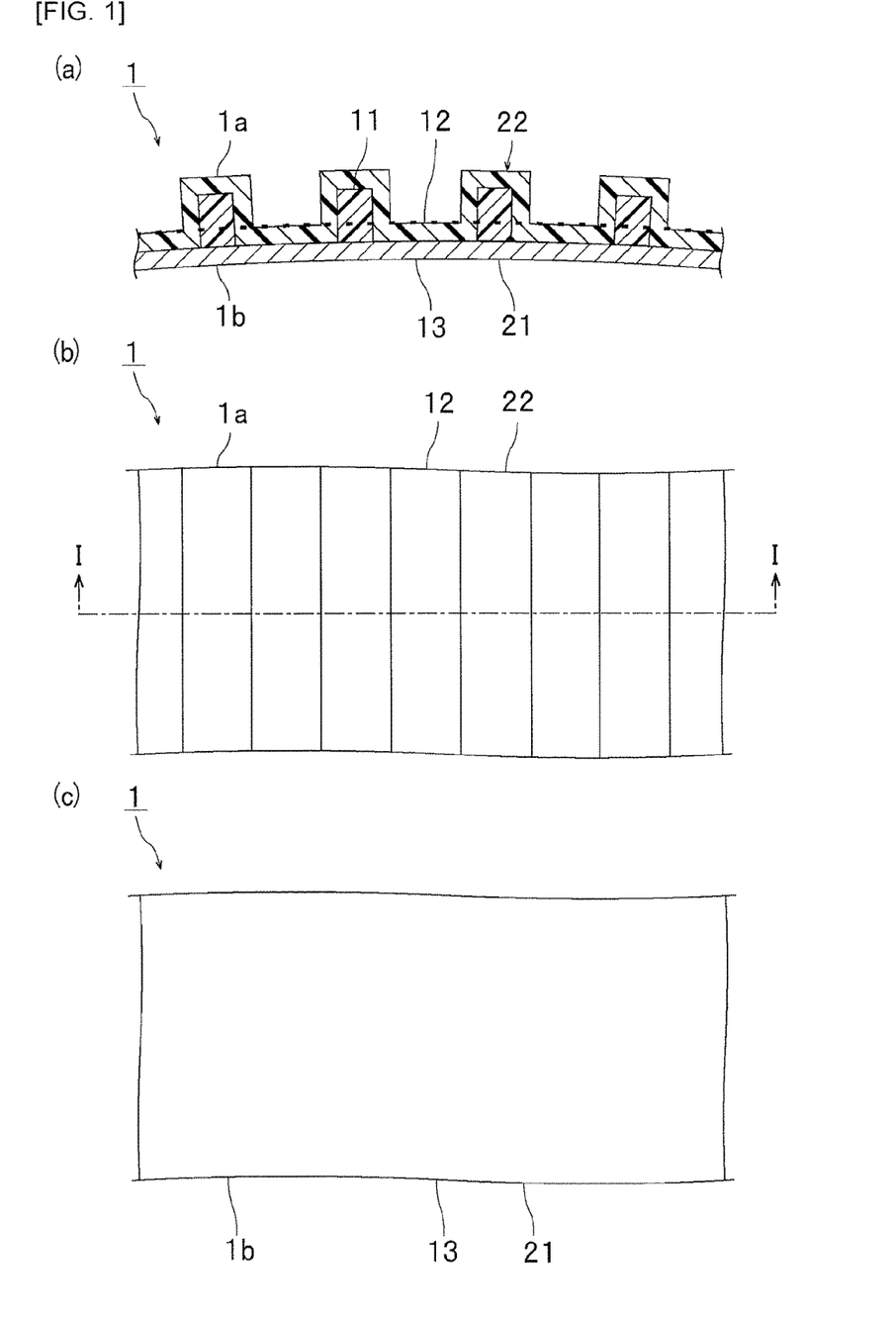
FIGS. 1(a), 1(b), and 1(c) are a front cross-sectional view, a top view, and a bottom view showing a fiber-reinforced sheet according to the first embodiment of the present invention.
Figure 5:
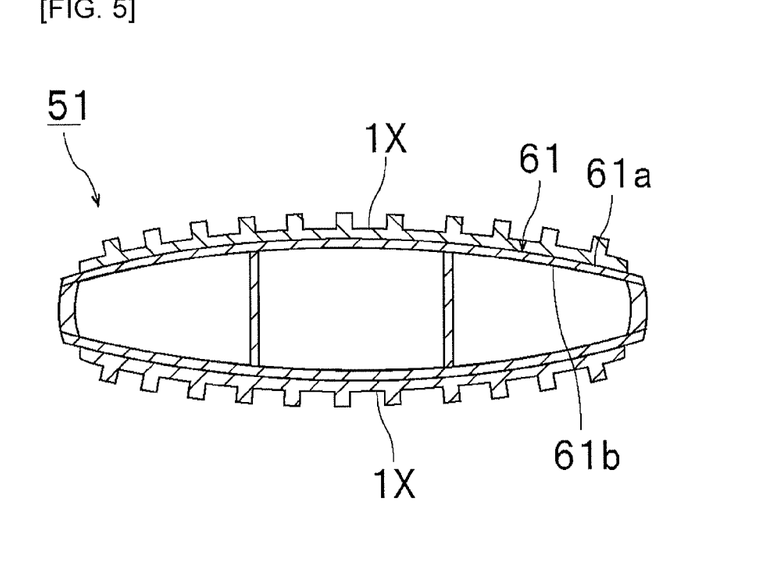
FIG. 5 is a cross-sectional view showing a windmill blade using the fiber-reinforced sheets shown in FIG. 1.

FIG. 5 is a cross-sectional view showing a windmill blade 51 using the fiber-reinforced sheets 1 shown in FIG. 1. The windmill blade 51 is a structure.

The windmill blade 51 comprises a windmill blade body 61 and fiber resin portions 1X formed from the fiber-reinforced sheets 1. The fiber resin portions 1X are attached to surfaces of the windmill blade body 61. In this embodiment, the fiber resin portions 1X are attached to the outside surfaces 61a of the windmill blade body 61. The windmill blade body 61 is an attachment target member. In FIG. 5, for the convenience of illustration, the fiber resin portions 1X are schematically shown.

The fiber resin portions may be attached to the inside surfaces 61b of the windmill blade body 61.

In the windmill blade 51, the fiber resin portions 1X formed from the fiber-reinforced sheets 1 are attached, and therefore the strength can be dramatically increased. Further, in the windmill blade 51, the fiber resin portions 1X are attached to surfaces of the windmill blade body 61 in a state in which the resin-unimpregnated fiber bundle portions or partially resin-impregnated fiber bundle portions 13 in the fiber-reinforced sheets 1 are impregnated with a resin or an adhesive. The windmill blade 51 and the fiber resin portions 1X can be integrated. Therefore, the peeling of the fiber resin portions 1X can be suppressed.

Like the windmill blade 51, it is preferred that a windmill blade body is formed as the above structure body to obtain a windmill blade.

Examples of the above resin with which the above resin-unimpregnated fiber bundle portion or the above partially resin-impregnated fiber bundle portion is impregnated include thermosetting resins, thermoplastic resins, and moisture-curable resins. Thermoplastic resins are preferred.

The above resin or adhesive may have thermosetting properties. The temperature of the heating of the above resin or adhesive is appropriately set preferably considering thermosetting properties. From the viewpoint of suppressing changes in the shapes of the ridge portions of the fiber resin portion and the like, the temperature of the heating is preferably 120° C. or less.

EXPLANATION OF SYMBOLS 1, 1A, 1B, 1C . . . fiber-reinforced sheet
1a, 1Aa, 1Ba, 1Ca . . . first surface
1b, 1Ab, 1Bb, 1Cb . . . second surface
1X . . . fiber resin portion
11, 11A, 11B, 11C . . . non-fiber-bundle-containing resin portion
12, 12A, 12B, 12C . . . resin-impregnated fiber bundle portion
13, 13A, 13B, 13C . . . resin-unimpregnated fiber bundle portion or partially resin-impregnated fiber bundle portion
21, 21A, 21B, 21C . . . sheet body portion
22, 22A, 22B, 22C . . . first ridge portion
22Aa . . . recess
23B . . . second ridge portion
51 . . . windmill blade (structure)
61 . . . windmill blade body (attachment target member)
61a . . . outside surface
61b . . . inside surface

The invention claimed is:

1. A fiber-reinforced sheet comprising a resin and a fiber bundle, wherein
   the fiber-reinforced sheet comprises a resin-unimpregnated fiber bundle portion having a surface not impregnated with the resin or a partially resin-impregnated fiber bundle portion having a surface not impregnated with the resin,
   the fiber-reinforced sheet does not comprise or comprises a resin-impregnated fiber bundle portion having a surface impregnated with the resin,
   the sheet has a first surface and a second surface opposite to the first surface,
   the sheet comprises a sheet body portion and at least one ridge portion protruding from the sheet body portion toward the first surface, the ridge portion meaning only a protruding portion,
   the sheet comprises the resin-unimpregnated fiber bundle portion or the partially resin-impregnated fiber bundle portion at at least one of the first surface and the second surface,
   the ridge portion, which means only a protruding portion, comprises the resin-unimpregnated fiber bundle portion, the partially resin-impregnated fiber bundle portion or the resin-impregnated fiber bundle portion, and
   the ridge portion, which means only a protruding portion, comprises the fiber contained in the resin-unimpregnated fiber bundle portion, the partially resin-impregnated fiber bundle portion or the resin-impregnated fiber bundle portion.

2. The fiber-reinforced sheet according to claim 1, wherein the ridge portion comprises the resin.

3. The fiber-reinforced sheet according to claim 2, wherein the ridge portion comprises a non-fiber-bundle-containing resin portion not comprising a fiber bundle.

4. The fiber-reinforced sheet according to claim 3, wherein the non-fiber-bundle-containing resin portion is positioned inside the ridge portion.

5. The fiber-reinforced sheet according to claim 1, comprising the resin-impregnated fiber bundle portion having the surface impregnated with the resin.

6. The fiber-reinforced sheet according to claim 5, comprising the resin-impregnated fiber bundle portion at the second surface.

7. The fiber-reinforced sheet according to claim 5, comprising the resin-impregnated fiber bundle portion on the first surface side where the ridge portion is positioned.

8. The fiber-reinforced sheet according to claim 1, comprising the resin-unimpregnated fiber bundle portion or the partially resin-impregnated fiber bundle portion on the first surface side where the ridge portion is positioned.

9. The fiber-reinforced sheet according to claim 1, comprising the resin-unimpregnated fiber bundle portion or the partially resin-impregnated fiber bundle portion at the second surface.

10. The fiber-reinforced sheet according to claim 1, wherein the ridge portion has a rectilinearly extending portion.

11. The fiber-reinforced sheet according to claim 1, wherein the ridge portion has a curvilinearly extending portion.

12. The fiber-reinforced sheet according to claim 1, wherein a number of the ridge portions is plural.

13. The fiber-reinforced sheet according to claim 12, wherein directions in which a plurality of the ridge portions adjacent to each other extend are parallel or are shifted from each other by 10° or less.

14. The fiber-reinforced sheet according to claim 1, having a curved portion.

15. The fiber-reinforced sheet according to claim 1, wherein the ridge portion has a recess at a side surface.

16. The fiber-reinforced sheet according to claim 1, comprising at least one second ridge portion protruding from the sheet body portion toward the second surface.

17. The fiber-reinforced sheet according to claim 1, wherein the fiber-reinforced sheet has a length of 1 m or more.

18. The fiber-reinforced sheet according to claim 1, used for a windmill blade.

19. The fiber-reinforced sheet according to claim 1, wherein the resin-unimpregnated fiber bundle portion, the partially resin-impregnated fiber bundle portion, or the resin-impregnated fiber bundle portion is positioned in a surface portion of the ridge portion.

20. A structure comprising:
an attachment target member; and
a fiber resin portion formed from the fiber-reinforced sheet according to claim 1, wherein
the fiber resin portion is affixed to a surface of the attachment target member.

21. The structure according to claim 20, wherein
the attachment target member is a windmill blade body,
the fiber resin portion is attached to a surface of the windmill blade body, and
the structure is a windmill blade.

22. The structure according to claim 20, wherein
the fiber resin portion is attached to the surface of the attachment target member in a state in which the resin-unimpregnated fiber bundle portion, the partially resin-impregnated fiber bundle portion, or the resin-impregnated fiber bundle portion in the fiber-reinforced sheet is impregnated with a resin or an adhesive.

\* \* \* \* \*